US008260643B2

(12) United States Patent
Benayon et al.

(10) Patent No.: US 8,260,643 B2
(45) Date of Patent: Sep. 4, 2012

(54) GENERALIZED PARAMETRIC OPTIMIZATION ARCHITECTURE AND FRAMEWORK

(75) Inventors: Jay William Benayon, Thornhill (CA); Kui Yan Lau, Markham (CA); Humie Leung, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 11/847,697

(22) Filed: Aug. 30, 2007

(65) Prior Publication Data

US 2009/0063213 A1  Mar. 5, 2009

(51) Int. Cl.
 *G06F 17/30* (2006.01)
(52) U.S. Cl. ...................................................... 705/7.11
(58) Field of Classification Search .................. 705/7.11
 See application file for complete search history.

(56) References Cited

U.S. PATENT DOCUMENTS

| | | | |
|---|---|---|---|
| 6,934,931 B2 | 8/2005 | Plumer et al. | |
| 7,120,896 B2 | 10/2006 | Budhiraja et al. | |
| 2002/0038228 A1 | 3/2002 | Waldorf et al. | |
| 2002/0082811 A1 | 6/2002 | Honjas et al. | |
| 2004/0078777 A1 | 4/2004 | Bahrami | |
| 2004/0138935 A1 | 7/2004 | Johnson et al. | |
| 2005/0027577 A1* | 2/2005 | Saeed | 705/8 |
| 2005/0091093 A1 | 4/2005 | Bhaskaran et al. | |
| 2006/0036941 A1* | 2/2006 | Neil | 715/526 |
| 2006/0047665 A1* | 3/2006 | Neil | 707/10 |
| 2006/0143057 A1 | 6/2006 | Sadiq | |
| 2006/0206890 A1* | 9/2006 | Shenfield et al. | 717/174 |
| 2006/0236302 A1* | 10/2006 | Bateman et al. | 717/104 |
| 2008/0250316 A1* | 10/2008 | Zhang et al. | 715/708 |

OTHER PUBLICATIONS

Client/server and host app. development tools.(1995 Database Buyers Guideb and Client/Server Sourcebook)(Buyers Guideb) Date: May 15, 1995; Supplier Number: 17155728.*
NexPrise Delivers nProcess Platform@ 4.0 for Rapidly Automating Manufacturers' Business Processes Newest Release of nProcess Platform@ Expands Business Process Application Collaboration and Document Management While Speeding Development Date: May 10, 2004.*
Sockeye Solutions Launches Collaborative Application Framework 3.0 Date: Jan. 13, 2004.*

(Continued)

*Primary Examiner* — Romain Jeanty
*Assistant Examiner* — Luis Santiago
(74) *Attorney, Agent, or Firm* — Yee & Associates, P.C.; David A. Mims, Jr.

(57) ABSTRACT

A computer implemented method, data processing system, and computer program product for providing an optimization solution comprising an open, generalized and reusable parametric optimization framework and architecture which enables rapid deployment of optimization solutions to any tool or program that builds on an integrated development environment platform. In the optimization framework, a core optimization plugin is provided which comprises an internal optimization model and a set of optimization tools. The optimization framework also comprises pluggable and customizable component providers and descriptors external to the core optimization plugin. The core optimization plugin receives configuration information from a user. The information enables the core optimization plugin to interact with a user data model in a plurality of different user data models. The information also enables the core optimization plugin to interact with providers selected from the plurality of providers and descriptors based on a format of the user data model.

14 Claims, 14 Drawing Sheets

OTHER PUBLICATIONS

Lendermann et al., "An Integrated and Adaptive Decision-Support Framework for High-tech Manufacturing and Service Networks", Proceedings of the 2005 Winter Simulation Conference, Orlando Florida, pp. 2052-2062.

Hlupic et al., "Business Process Modelling and Analysis Using Discrete-Event Simulation", Proceedings of the 1998 Winter Simulation Conference, Washington D.C., pp. 1363-1369.

Virine et al, "Visual Modeling of Business Problems: Workflow and Patterns", Proceedings of the 2004 Winter Simulation Conference, Washington D.C., pp. 1839-1846.

Painter et al., "A Methodology for Integrating Business Process and Information Infrastructure Models", Proceedings of the 1996 Winter Simulation Conference, Coronado, CA, US, pp. 1305-1312.

Zhou et al., "Project-oriented Business Process Performance Optimization", 2003 IEEE International Conference on Systems, Man and Cybernetics, vol. 5, pp. 4079-4084.

Debenham, "An Intelligent Multiagent System for the Management of Strategic Business Processes", 2001 IEEE/IFIP International Symposium on Integrated Network Management Proceedings, pp. 869-882.

Benjamin et al., "An Introduction to Using PROSIM for Business Process Simulation and Analysis", Proceedings of the 1998 Winter Simulation Conference, vol. 1, pp. 315-321.

Paul et al., "Simulation for Business Processes and Information Systems Design", Proceedings of the 2003 Winter Simulation Conference, pp. 1787-1796.

* cited by examiner

802 — variable retriever

```
public interface IBaseVariableValueRetriever ( public double retrieveValue (String varUID, String varFeatureID) ;
    public Double retrieveValue (String featureUID, HashMap map) ;

)
```

804 — variable updater

```
public interface IBaseVariableUpdater ( public void update (String varContainerUID, String varFeatureID, double value) ;

)
```

806 — context tree builder interface

```
public interface IOptContextTreeBuilder ( public void createInputOutputContextTree(OptimizationMode1 optMode 1, EObject profile, IBaseContextDescriptor baseDescriptor ) ;

public String getUID(Object obj) ;
    public String getName(Object obj) ;
    public boolean isDummyCtx(Object obj);
    public EObject getMode 1() ;
    public void setProfile(EObject mode 1) ;

public HashMap getUIDMap() ;

)
```

*FIG. 8* optimization engine provider extension point

```
[ <extension point="com.ibm.btools.optimization.OptimizationEngineProvider">
    <widgetFactory
        id="defaultOptimizationEngineProvider"
        name="Default Optimization Engine Provider"
        widgetFactoryClass="com.ibm.btools.optimization.common.DefaultOptimizationEngineProvider">
    </widgetFactory>
  </extension>
```

902 — The optimization engine provider interface

```
public interface IOptimizationEngineProvider ( public void optimize () ;

public void initialize () ;

public void stop () ;

public void pause () ;

- simulation engine provider extension point

```
<extension point="com.ibm.btools.optimization.SimulationEngineProvider">
  <simProvider
    id="BOMSimEngine"
    name="BOM Simulation Engine"
    widgetFactoryClass="com.ibm.btools.optimization.simulation.BOMSimulationEngine">
  </simProvider>
</extension>
```

1002 — The simulation engine provider interface

```
public interface ISimulationEngineProvider ( public void simulate () ;

public void stop () ;

public void pause () ;

// ....
)
```

*FIG. 10* input variable decriptor

1102
```
<!-- Input Control Variables Descriptors -->
<extension point="com.ibm.btools.optimization.contextVariableDescriptor">
    <contextVariable
        id="generatedRoleQuantity"
        name="Quantity"
        descriptorClass="com.ibm.btools.optimization.processprofile.contextvariable.descriptor.input.GeneratedRoleQuantityDescriptor">
    </contextVariable>
</extension>
``` output variable decriptor

1104
```
<!-- Output Control Variables Descriptor -->
<extension point="com.ibm.btools.optimization.contextVariableDescriptor">
    <contextVariable
        id="processAverageDuration"
        descriptorClass="com.ibm.btools.optimization.processprofile.contextvariable.descriptor.output.TmskElapsedDurationDescriptor"
        enable="true">
    </contextVariable>
</extension>
``` descriptor interfaces

1106
```
public interface IBaseContextVariableDescriptor (
    public String getID ();
    public String getVarCtxName ();
    public int getVarDataType ();
    public void setID(String id);
)

public interface IOptOutputControlBaseContextVariableDescriptor extends
    IBaseContextVariableDescriptor (
    public IBaseVariableValueRetriever getVariableValueRetriever ();
)
```

```
public interface IContextVariableDescriptor
extends
    IBaseContextVariableDescriptor (
    public EStructuralFeature getCtxVarFeature ();
    public EClass getCtxVarContainerClass ();
    public EStructuralFeature getCtxVarContainerFeature ();
)

public interface
IOptOutputControlBaseContextVariableDescriptor extends
    IBaseContextVariableDescriptor (
    public IBaseVariableValueRetriever
getVariableValueRetriever ();
)
```

*FIG. 11*

□ UI widget factory provider extension point

```
<extension point="com.ibm.btools.optimization.widgetFactory">
    <widgetFactory
        id="defaultWidgetFactory"
        name="Default Widget Factory"
        widgetFactoryClass="com.ibm.btools.optimization.ui.common.GenericOptWidgetFactory">
    </widgetFactory>
</extension>
```

1202 □ UI Widget Factory Provider Interface

```
public interface IWidgetFactory { public boolean isRightToLeft () ;
    public Composite createComposite (Composite parent) ;
    public Composite createComposite (Composite parent, int style) ;
    public Label createLabel (Composite parent, String text) ;
    public Label createLabel (Composite parent, String text, int style) ;
    public TabFolder createTabFolder (Composite parent, int style) ;
    public TabItem createTabItem (TabFolder parent, int style) ;
    public Composite createTitleComposite (Composite parent, String title) ;
    public Text createText (Composite parent, int style) ;
    public Text createText (Composite parent, String defaultValue, int style) ;
    public Button createButton (Composite parent, int style) ;
    //...
```

*FIG. 12*

GENERALIZED PARAMETRIC OPTIMIZATION ARCHITECTURE AND FRAMEWORK

BACKGROUND OF THE INVENTION

1. Field of the Invention

The present invention relates generally to business process modeling, and in particular to a computer implemented method, data processing system, and computer program product for providing an open, generalized and reusable parametric optimization framework and architecture which enables rapid deployment of optimization solutions to any tool or program that builds on the Eclipse™ platform.

2. Description of the Related Art

Business process management (BPM) comprises tools which enable business analysts to model, simulate, and analyze complex business processes quickly and effectively. A business process is a process that provides some service for a requesting application, a user, or a customer. The business process may comprise a collection of interrelated tasks, which solve a particular issue.

Within the business process management space, business process simulation, or testing of the business processes in the field, has become an important feature. An objective of business process simulation is to implement what-if scenarios of the measured goals (e.g., processing time, cost, wait time, etc.) over a set of input parameters (e.g., duration of task A, cost of resource B, etc). A problem with existing business process simulation methods is that if a business user wants to determine what combination of input parameters can give the best or optimal results of the measured goals, the user may need to simulate many times with different combinations of the input parameters. Consequently, a lot of effort may be needed to set up the parameters, start the simulations, record the simulation results, compare what combinations have given the best results, or even plot graphs to see the trend of the measured goals with all of the different parameter combinations. Even more problematic is that the simulation procedure is performed mostly manually.

While some optimization solutions for business processes are currently available, these existing optimization solutions employ proprietary optimization technology and solutions. Consequently, no reusability or extensibility of the solutions is possible. In addition, the existing optimization solutions may not plug into other different optimization software, nor interact with other user data models other than the proprietary data model with fixed input or output attributes for optimizing.

SUMMARY OF THE INVENTION

The illustrative embodiments provide a computer implemented method, data processing system, and computer program product for providing an optimization solution comprising an open, generalized and reusable parametric optimization framework and architecture which enables rapid deployment of optimization solutions to any tool or program that builds on an integrated development environment platform. In the optimization framework and architecture, a core optimization plugin is provided which comprises an internal optimization model and a set of optimization tools. The optimization framework and architecture also comprises pluggable and customizable component providers and descriptors external to the core optimization plugin. The core optimization plugin receives configuration information from a user. The configuration information enables the core optimization plugin to interact with a user data model in a plurality of different user data models. The configuration information also enables the core optimization plugin to interact with providers selected from the plurality of pluggable and customizable component providers and descriptors based on a format of the user data model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 illustrates exemplary optimization facilities provided to users in accordance with the illustrative embodiments;

FIG. 9 illustrates an optimization engine provider plugin in accordance with the illustrative embodiments;

FIG. 10 illustrates a simulation engine provider plugin in accordance with the illustrative embodiments;

FIG. 11 illustrates an input/output variable descriptor plugin in accordance with the illustrative embodiments;

FIG. 12 illustrates a user interface widget factory provider plugin in accordance with the illustrative embodiments;

DETAILED DESCRIPTION OF THE PREFERRED EMBODIMENT

Figure 1:
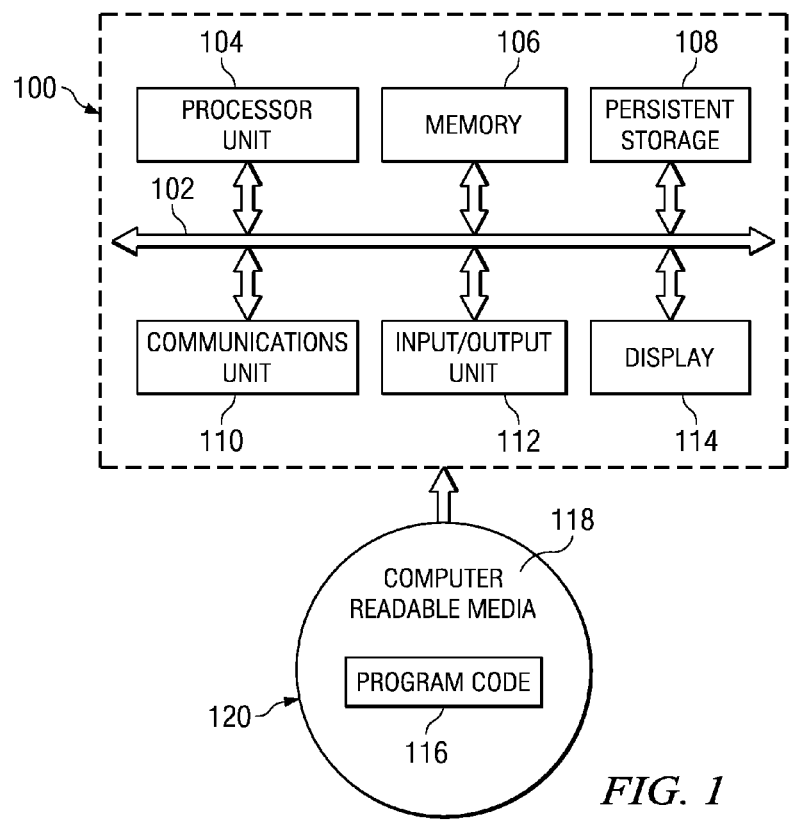
FIG. 1 is a block diagram of a data processing system in which the illustrative embodiments may be implemented.

With reference now to FIG. 1, a block diagram of a data processing system is shown in which illustrative embodiments may be implemented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

For example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments provide a computer implemented method, data processing system, and computer program product for providing an optimization solution in the business process management space. The optimization solution in the illustrative embodiments comprises an open, generalized and reusable parametric optimization framework and architecture which enables rapid deployment of optimization solutions to any tool or program that builds on an integrated development environment platform, such as the Eclipse™ platform. The optimization framework in the illustrative embodiments provides an enriched set of tools to enable the set up and configuration of optimization profiles, the visualization of optimization results in graph or tabular form, and the interaction of a set of optimization facilities with any user data model (e.g., Java™ model, Eclipse Modeling Framework (EMF) model, etc). Furthermore, the optimization framework provides flexibility and extensibility to plug into any specialized component providers, such as an optimization engine, simulation engine, or even customized user interfaces. As current technology advances rapidly, the open and generalized optimization framework allows for the plug in of new or improved components as needed (e.g., an optimization engine from another vendor or an improved version of the simulation engine) at any time without requiring a large amount of effort to re-write and re-engineer the whole tool or program.

The optimization framework provided in the illustrative embodiments has several advantages over existing optimization solutions. One advantage is that parametric optimization provided by the optimization framework can be used to automate manual optimization processes currently in the market and to determine the optimal results out of all different combination of parameters automatically and more efficiently. In addition, the optimization framework is open and generalized, rather than a proprietary optimization solution which currently exists in other optimization tools in the market. Thus, the optimization framework can plug in with any optimization or simulation engine.

Furthermore, the optimization framework provides facilities to interact with any user data model with any configurable input or output attributes for optimization. The tool set provided by the optimization framework provides a common usage or user interfaces for editing optimization profile settings and for visualizing optimization results independently of the particular optimization engine provider, simulation engine provider, or data model in use. Thus, the common usage or user interfaces of the tool set creates a simpler learning curve as users will not notice any difference if the component providers or data models change.

Figure 2:
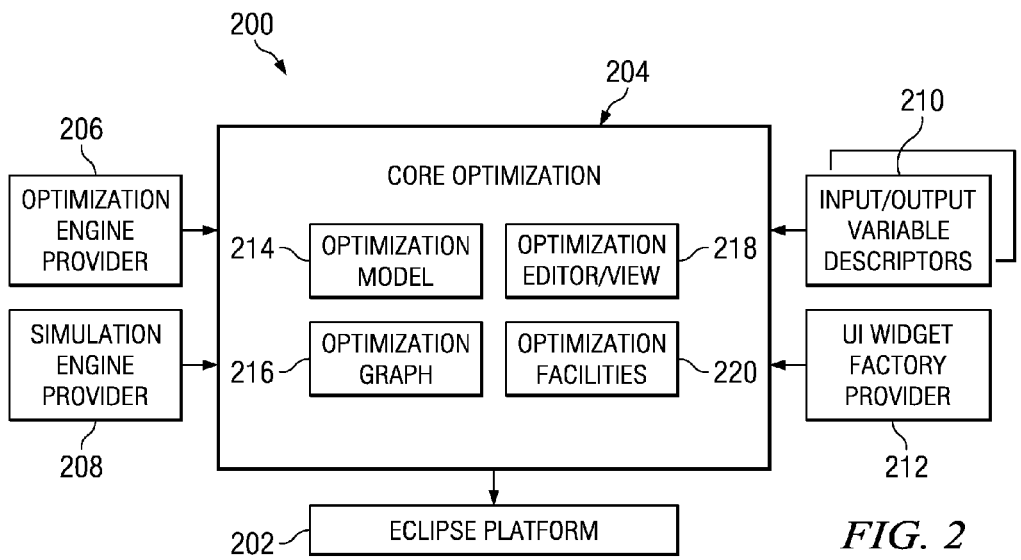
FIG. 2 is a block diagram of the open, generalized parametric optimization framework and architecture in accordance with the illustrative embodiments.

FIG. 2 is a block diagram of the open, generalized parametric optimization framework and architecture in accordance with the illustrative embodiments. Optimization framework 200 helps deploy optimization solutions quickly and easily to any tool or program that builds on the Eclipse platform with greater flexibility, extensibility, and configurability. Optimization framework 200 also comprises an enriched set of tools and facilities that make optimization framework 200 more flexible and features-rich.

Optimization framework 200 is built on Eclipse framework 202. Optimization framework 200 comprises core optimization 204 and customized or third party component providers, including optimization engine provider 206, simulation engine provider 208, input/output variable descriptors 210, and user interface (UI) widget factory provider 212. In this illustrative example, core optimization 204 is a plugin to Eclipse platform 202, and the customized or third party component providers (e.g., optimization engine provider 206, simulation engine provider 208, input/output variable descriptors 210, and user interface (UI) widget factory provider 212) are plugins to core optimization 204. By having the customized or third party component providers be pluggable on top of core optimization 204, optimization framework 200 is made more open, generalized, extensible, and configurable.

Core optimization 204 is the core of the optimization framework. Core optimization 204 operates to orchestrate interactions among all internal components within core optimization 204 and all pluggable components in optimization framework 200, and in effect 'hook' the components together. Core optimization 204 comprises various sub-components including an optimization model (optimization model 214) and a set of tools (optimization editor/view 218, the optimization graph view 216, and optimization facilities 220). Optimization model 214 is a generic model to be used internally by the optimization framework and which retains all optimization related information for optimization framework 200. Optimization model 214 is a medium between optimization framework 300 and user data model. Optimization model 214 defines the business problem, and scenario data is run against the user data model.

Optimization editor/view 218 allows a user to view and manage optimization. Optimization graph view 216 is a viewer which allows the user to visualize optimization results graphically. Optimization facilities 220 enable optimization framework 200 to understand how to interact or communicate to and from a user data model, such as reading data from the user data model, updating data to user data model, etc. A user data model is the domain model that the user's application employs. A user data model may be model built by using simple Java objects, JavaBeans, EMF, etc. Optimization facilities 220 also comprise a set of interfaces for users to customize their user data model. The set of interfaces has a common look and feel. The user may use optimization facilities 220 to create and edit optimization profiles, obtain optimization results in graph or tabular form, and interact with user data.

Core optimization 204 is responsible for the tasks of initializing the core optimization and loading up of all pluggable component providers. In initializing the core optimization, core optimization 204 first loads up and initializes the various sub-components in core optimization 204, including optimization model 214, optimization editor/view 218, optimization graph view 216, and optimization facilities 220. Core optimization 204 then creates and initializes optimization model 214 with fundamental data. Fundamental data are default or initial values for the optimization model, i.e, how long to run optimization, available control variables, etc. Core optimization 204 also initializes optimization editor/view 218, and initializes optimization facilities 220 that interact with business process data model provided by the user. Optimization facilities 220 enable a user to perform various tasks, such as retrieve data, update data, create context trees, etc.

In loading up of all pluggable component providers, core optimization 204 first loads up pluggable component providers such as optimization engine provider 206, simulation engine provider 208, input/output variable descriptors 210, and user interface (UI) widget factory provider 212. Core optimization 204 validates all of the pluggable components to ensure that the pluggable components conform to optimization framework 200. Core optimization 204 then initializes all of the pluggable components.

Figure 3A:
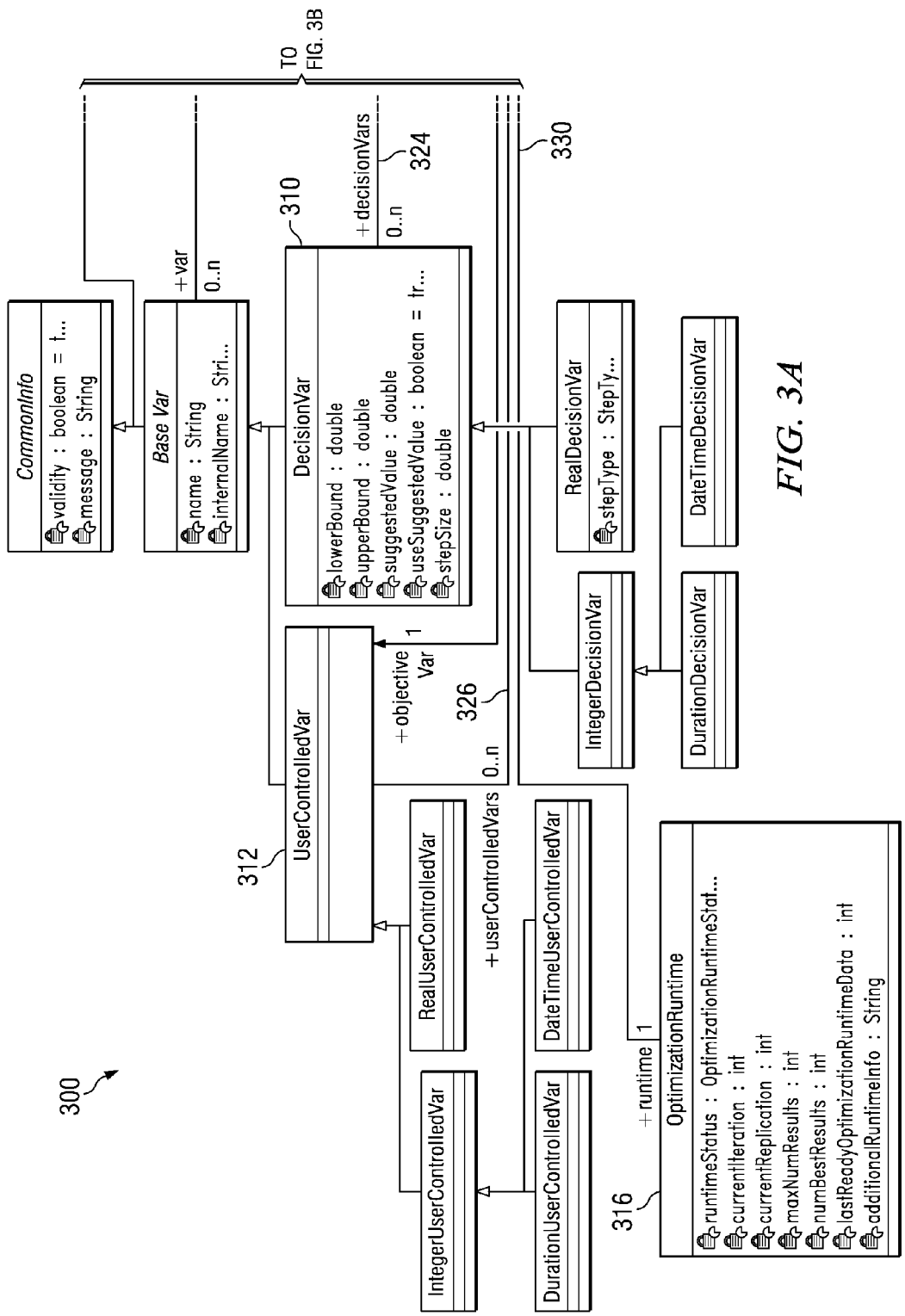
FIGS. 3A-3B are a Unified Modeling Language (UML) diagram of an exemplary core model in accordance with the illustrative embodiments.
Figure 3B:
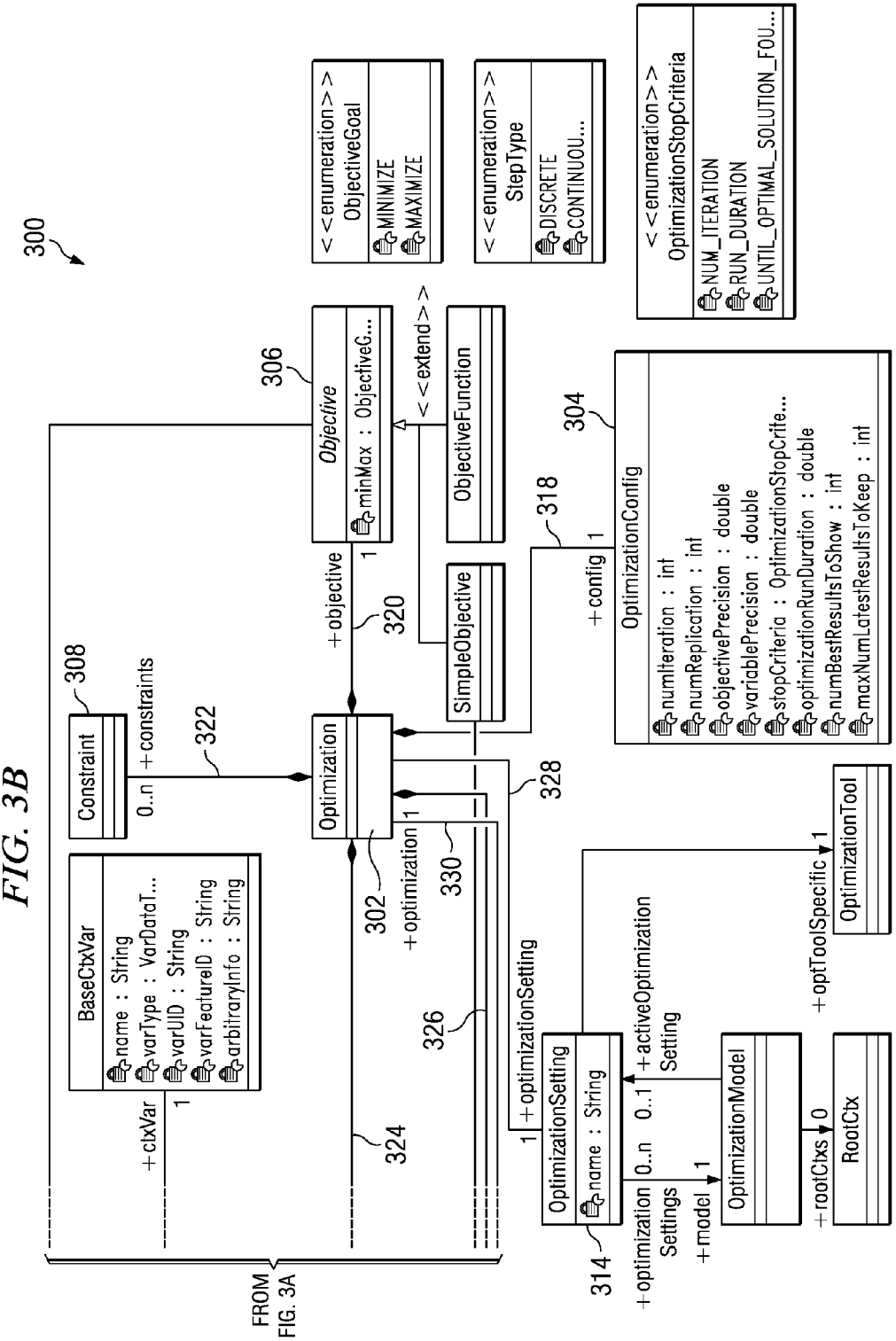
Figure 4:
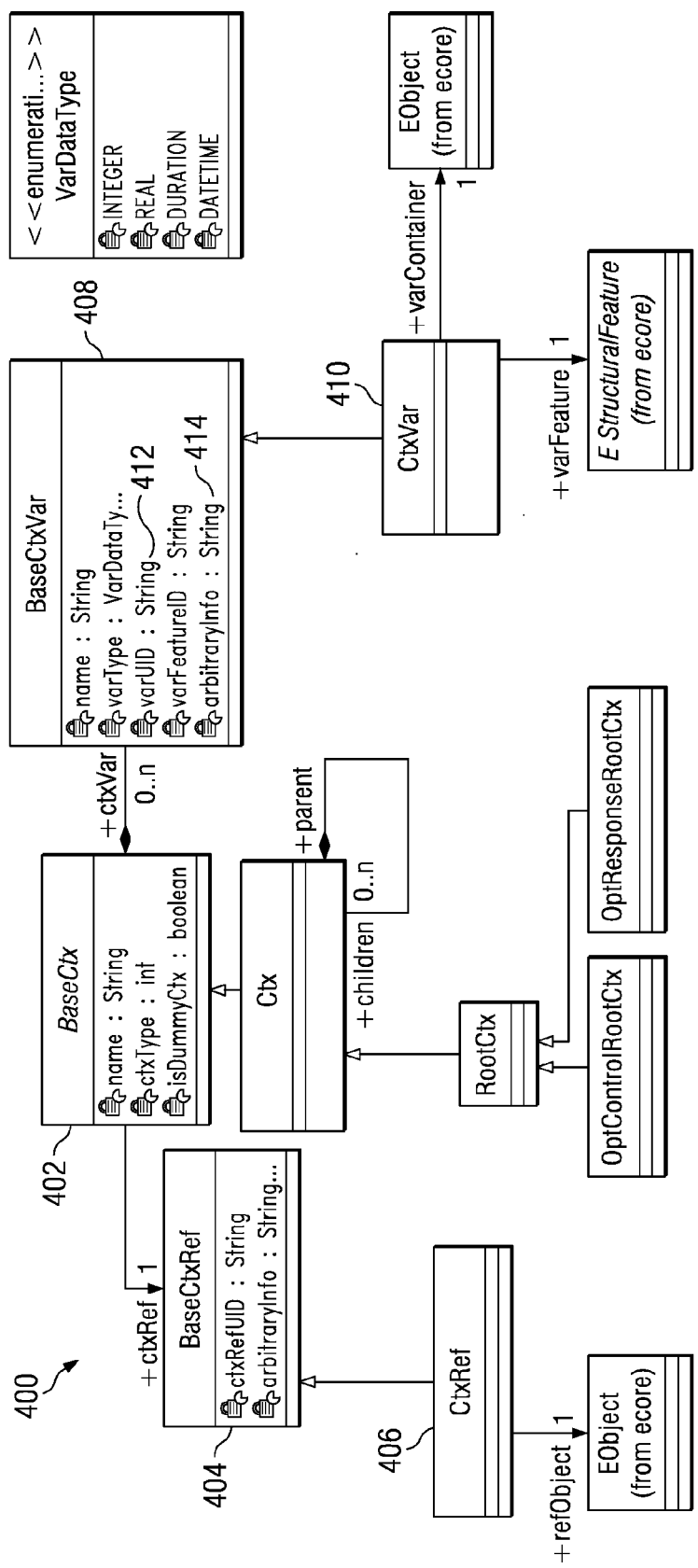
FIG. 4 is a UML diagram of an exemplary context model in accordance with the illustrative embodiments.
Figure 5:
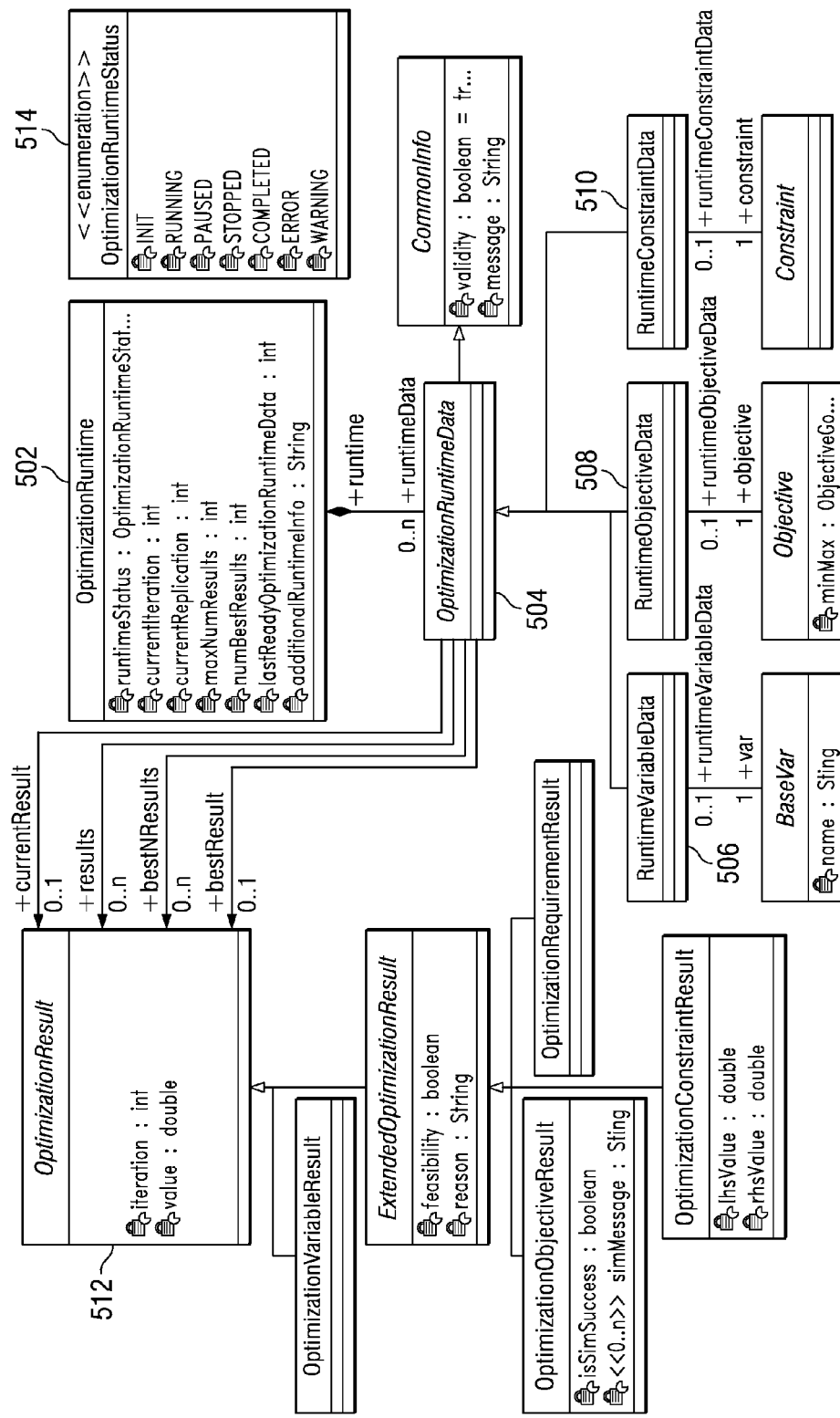
FIG. 5 is a UML diagram of an exemplary runtime model in accordance with the illustrative embodiments.

FIGS. 3-5 are exemplary Unified Modeling Language (UML) diagrams of the optimization model 214 in FIG. 2. Optimization model 214 retains all optimization related information for optimization framework 200 in FIG. 2. Optimization model 214 in FIG. 2 comprises three submodels—a core model, a context model, and a runtime (result) model. Classes within the three submodels are related among the models. For instance, the core model contains references to the context model and references to the runtime result model. The runtime model contains references to the context model. Optimization model 214 in FIG. 2 is divided into the three submodels to enable one to easily understand the model logically.

While the exemplary core model, context model, and runtime models in FIGS. 3-5 are illustrated using UML, other modeling languages and other languages (object oriented, structured or other) may also be employed.

In FIGS. 3A-3B, an exemplary UML diagram of an exemplary core model in accordance with the illustrative embodiments is shown. UML diagram 300 shows various data objects, including Optimization object 302, OptimizationConfig object 304, Objective object 306, Constraint object 308, DecisionVar object 310, UserControlledVar object 312, OptimizationSetting object 314, and OptimizationRuntime object 316. The top pane in each object box represents the name of the data object. The middle pane in each object box represents the list of attributes (also known as "fields") of the data object. An attribute has a name and a type.

Notations between the data objects in UML diagram 300 are shown by association notations 318-330. Notations are used to represent a reference or relationship between two objects. A notation contains either one or two roles representing each potential direction of the association. For example, notation 318 includes a "diamond" which indicates an aggregation relationship, wherein Optimization object 302 comprises an aggregation of (or contains) objects of OptimizationConfig object 304. Notation 328 illustrates a one-to-one association relationship between Optimization object 302 and OptimizationSetting object 314. Thus, each optimization has one optimization setting.

UML diagram 300 retains and manages the optimization profile setting in OptimizationSetting object 314. UML diagram 300 also retains and manages the objective of the optimization in Objective object 306, the input/output variables used in the optimization in DecisionVar object 310 and UserControlledVar object 312, the constraints on the optimization in Constraint object 308, among other settings. UML diagram 300 is further used for retaining the configuration of an optimization in Optimizationconfig object 304.

In FIG. 4, an exemplary UML diagram of the exemplary context model in accordance with the illustrative embodiments is shown. The context model described in UML diagram 400 comprises data objects which describe the optimization context tree structure, the optimization context and context variables, and the references to attributes of the user data model.

UML diagram 400 comprises a context data objects BaseCtx object 402, BaseCtxRef 404, CtxRef object 406, BaseCtxVar object 408, and CtxVar object 410. As previously mentioned, the optimization framework allows users to edit the optimization profile settings independently of the particular data model the user is using. BaseCtxRef 404 is the context reference used in the optimization if the user data model referenced (by a unique identifier (UID) or some additional information, via ctxRefUID or arbitraryinfo in BaseCtxRef 404), is not an Eclipse Modeling Framework (EMF) model (e.g., a Java™ model). Alternatively, CtxRef 406 is the context reference used in the optimization if the user data model referenced is an EMF model. The type of the reference determines whether BaseCtxRef 404 or CtxRef 406 is employed. For example, if the context reference is a type of BaseCtxRef 404, then BaseCtxRef 404 references a non-EMF user data model. If the context reference is a type of CtxRef 406, then CtxRef 406 references to an EMF user data model. It should be noted that BaseCtxRef 404 and CtxRef 406 should not be mixed in the same root context hierarchy.

BaseCtxVar object 408 is the context reference used in the optimization to create context variables that do not reference an EMF model or do not intend to reference an EMF model. A non-EMF model may include an internal simulation model. The usage of varUID 412 in BaseCtxVar object 408 depends upon the particular implementation used. In addition, arbitraryInfo 414 is used in BaseCtxVar object 408 to store additional information if needed. CtxVar object 410 is the context reference used in the optimization to create context variables that reference an EMF model, such as a simulation profile. It should be noted that BaseCtxVar object 408 and CtxVar object 410 should not be mixed in the same root context hierarchy.

FIG. 5 is an exemplary UML diagram of an exemplary runtime model in accordance with the illustrative embodiments. The runtime model described in UML diagram 500 comprises data objects which retain the results of optimization. OptimizationRuntime object 502 is an aggregation of OptimizationRuntimedata object 504, which is associated with RuntimeVariableData object 506, RuntimeObjectiveData object 508, and RuntimeConstraintData object 510. Results of optimization (and historic optimization data) are retained in OptimizationResult object 512. UML diagram 500 also retains and manages the status of the runtime optimization in OptimizationRuntimeStatus object 514.

Figure 6:
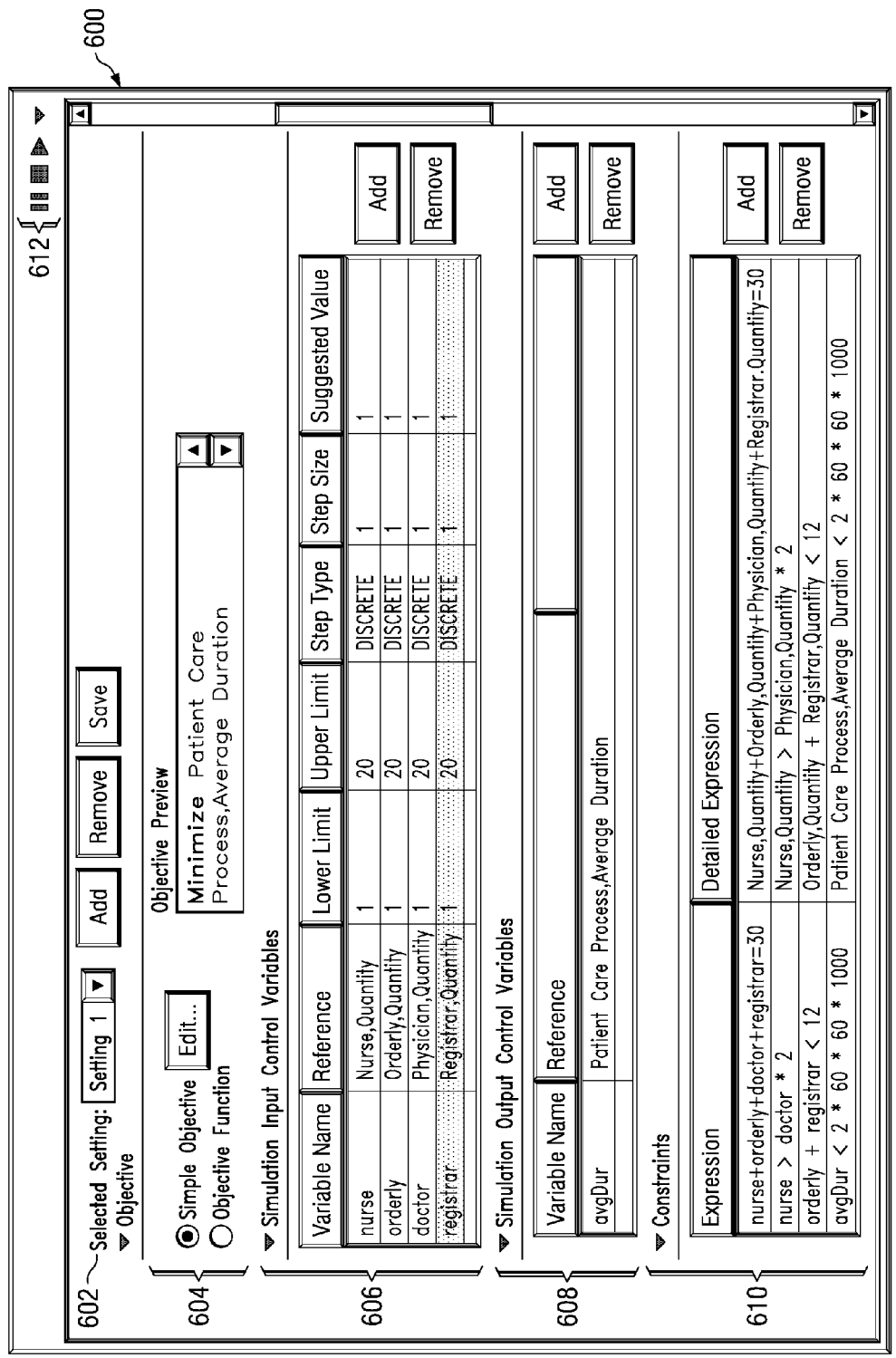
FIG. 6 is an exemplary graphical user interface (GUI) illustrating an optimization editor/view in accordance with the illustrative embodiments.

FIG. 6 is an exemplary graphical user interface (GUI) illustrating an optimization editor/view in accordance with the illustrative embodiments. Optimization editor/view 600 is one of the tools provided in the optimization framework and allows a user to create and edit an optimization profile. Optimization editor/view 600 is a detailed example of optimization editor/view 218 in FIG. 2.

With optimization editor/view 600, a user may select a particular optimization setting 602, and set or change the optimization objective 604 as shown. The user may also set or change the simulation input control variables 606, the output control variables 608, and the constraints 610 on the optimization. Consequently, a user may customize an optimization user interface widget obtained from a user interface widget factory provider.

Optimization editor/view 600 also provides an optimization control panel 612 which enables a user to run, pause, or stop the optimization. An optimization result tabular viewer (shown in FIG. 7) is also provided by optimization editor/view 600 to enable the user to visualize the optimization results in tabular form.

Figure 7:
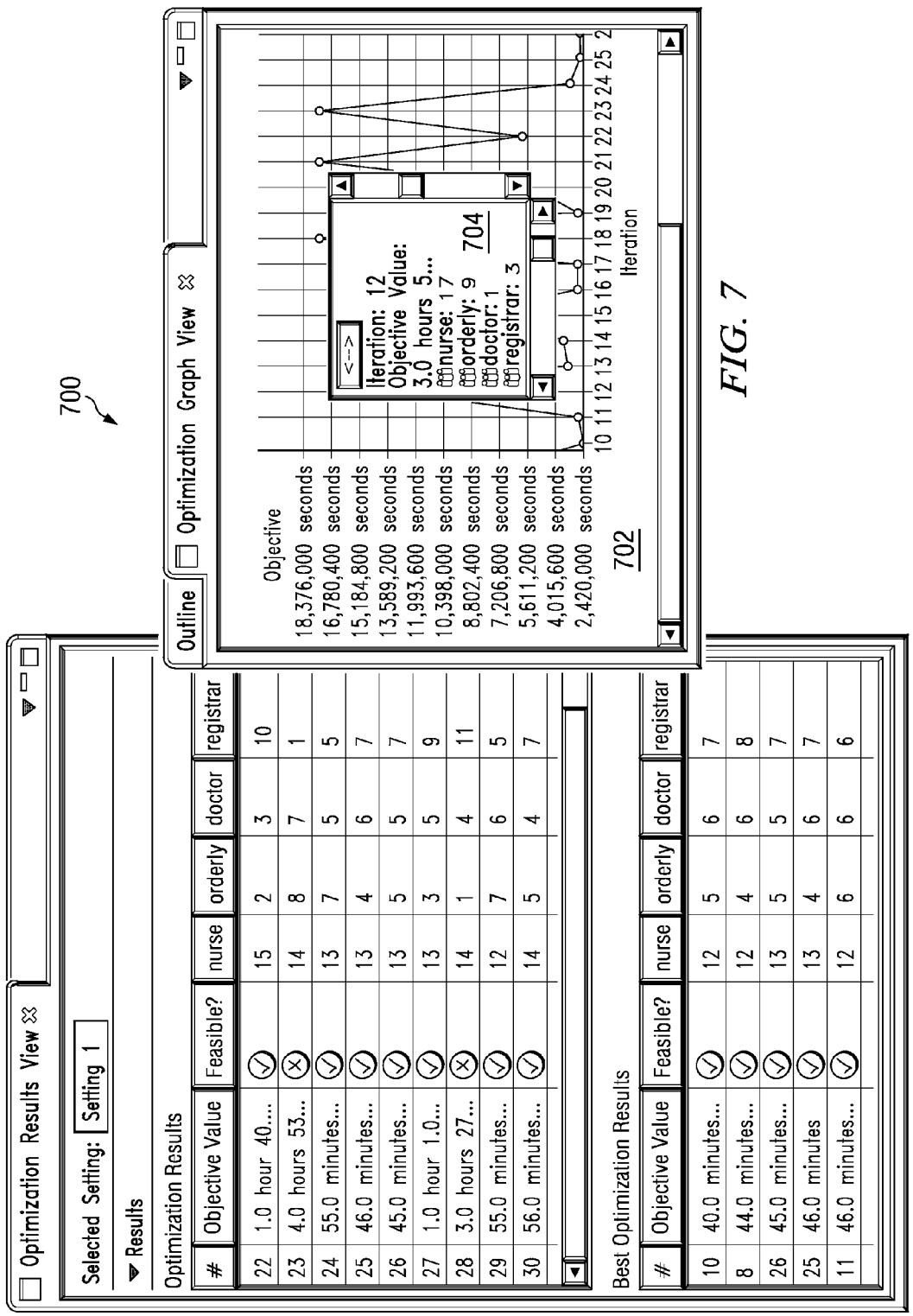
FIG. 7 is an exemplary graphical user interface illustrating an optimization graph view in accordance with the illustrative embodiments.

FIG. 7 is an exemplary graphical user interface illustrating an optimization graph viewer in accordance with the illustrative embodiments. Optimization graph viewer 700 is one of the tools provided in the optimization framework. Optimization graph viewer 700 is a detailed example of optimization graph 216 in FIG. 2.

Optimization graph viewer 700 enables a user to visualize the optimization results graphically. Dynamic line graph view 702 comprises areas in which the user may hover the mouse pointer to show detailed information 704 about an area. Optimization graph viewer 700 may also provide the user with an overview of the trend of optimization results.

FIGS. 8-12 are key pluggable and customizable optimization component providers or facilities that are provided by the optimization framework. In order to enable the optimization framework to work with other optimization engines, simulation engines, user data models, UI widgets, the optimization component providers or facilities in FIGS. 8-12 should be provided and customized by the user.

In FIG. 8, exemplary optimization facilities provided to users in accordance with the illustrative embodiments are shown. The optimization facilities in FIG. 8 are detailed examples of optimization facilities 220 in FIG. 2. The optimization facilities allow the optimization framework to understand how to interact or communicate to and from the user data model (e.g., read data from or update data to the user data model, etc.) based on input provided by the user. As previously mentioned, these optimization facilities may interact with any user data model and enables optimization using any configurable input or output attributes.

The optimization facilities provided by the optimization framework allow users to customize the interactions to the user's data model. For instance, the user may customize the variable retrievers 802, variable updaters 804, and context tree builder interface 806 for the user's data model. Variable retriever 802 is a facility which is used to retrieve values from the user data model. Variable updater 804 is a facility which is used to update values to the user data model. Variable context tree builder 806 is a facility which allows for building an input/output context tree to be used by the optimization framework and optimization tools. The configurable input/output and their context may be defined via input/output descriptors.

FIG. 9 illustrates an optimization engine provider plugin in accordance with the illustrative embodiments. The third party optimization engine provider in FIG. 9 is a detailed example of optimization engine provider 206 in FIG. 2. The optimization engine provider provides an optimization engine to the optimization framework. The optimization engine searches for solutions to a business process optimization problem by applying the user's data model to various scenarios.

The optimization engine provider is pluggable using any optimization engine based on input provided by the user. Thus, the optimization framework does not dictate the type of optimization engine that must be used, but rather the optimization/simulation engine provider to be used for optimization may be specified through the framework based on details supplied by the user to the framework. These details may include information needed run the particular optimization, such as how to start optimization by implementing the optimize( ) method, what optimization engine provider (or simulation engine provider) the optimization framework should setup and initialize via the initialize( ) method, and the like.

The user may register the optimization engine provider to be used in an eXtensible Markup Language (XML) document (plugin.xml) which specifies which optimization engine provider is in use.

The optimization framework provides an interface 902 to a third party optimization engine provider to allow the optimization engine provider to connect to the optimization framework. In order to be able to connect the optimization engine provider with the optimization framework, the optimization engine provider should conform to the optimization engine provider interfaces 902.

FIG. 10 illustrates a simulation engine provider plugin in accordance with the illustrative embodiments. The simulation engine provider in FIG. 10 is a detailed example of simulation engine provider 208 in FIG. 2. The third party simulation engine provider provides a simulation engine which tests a solution to a business process in the field.

Like the optimization engine provider, the simulation engine provider is pluggable using any simulation engine. Thus, the optimization framework does not dictate the type of simulation engine that must be used, and the simulation engine in use is based on details provided by the user to the framework. The simulation framework provides an interface 1002 to a third party simulation engine provider to allow the simulation engine provider to connect to the optimization framework. In order to be able to connect the simulation engine provider with the optimization framework, the simulation engine provider should conform to the simulation engine provider interfaces 1002.

FIG. 11 illustrates an input/output variable descriptor plugin in accordance with the illustrative embodiments. The input/output variable descriptors in FIG. 11 are detailed examples of input/output variable descriptors 210 in FIG. 2. The optimization framework provides input control variable descriptors 1102 and output control variable descriptors 1104 which may reference any attribute in the user data model. In order to be able to connect the input/output variable control descriptors with the optimization framework, the input/output variable descriptors should conform to the input/output variable descriptors interfaces 1106.

FIG. 12 illustrates a user interface widget factory provider plugin in accordance with the illustrative embodiments. The user interface widget factory provider in FIG. 12 is a detailed example of user interface widget factory provider 212 in FIG. 2. The user interface widget factory provider is pluggable to allow the user to customize the widgets, such as the widgets color schema, look and feel, etc. In order to be able to connect the user interface widget factory provider with the optimization framework, the user interface widget factory provider should conform to the user interface widget factory provider interfaces 1202.

Figure 13:
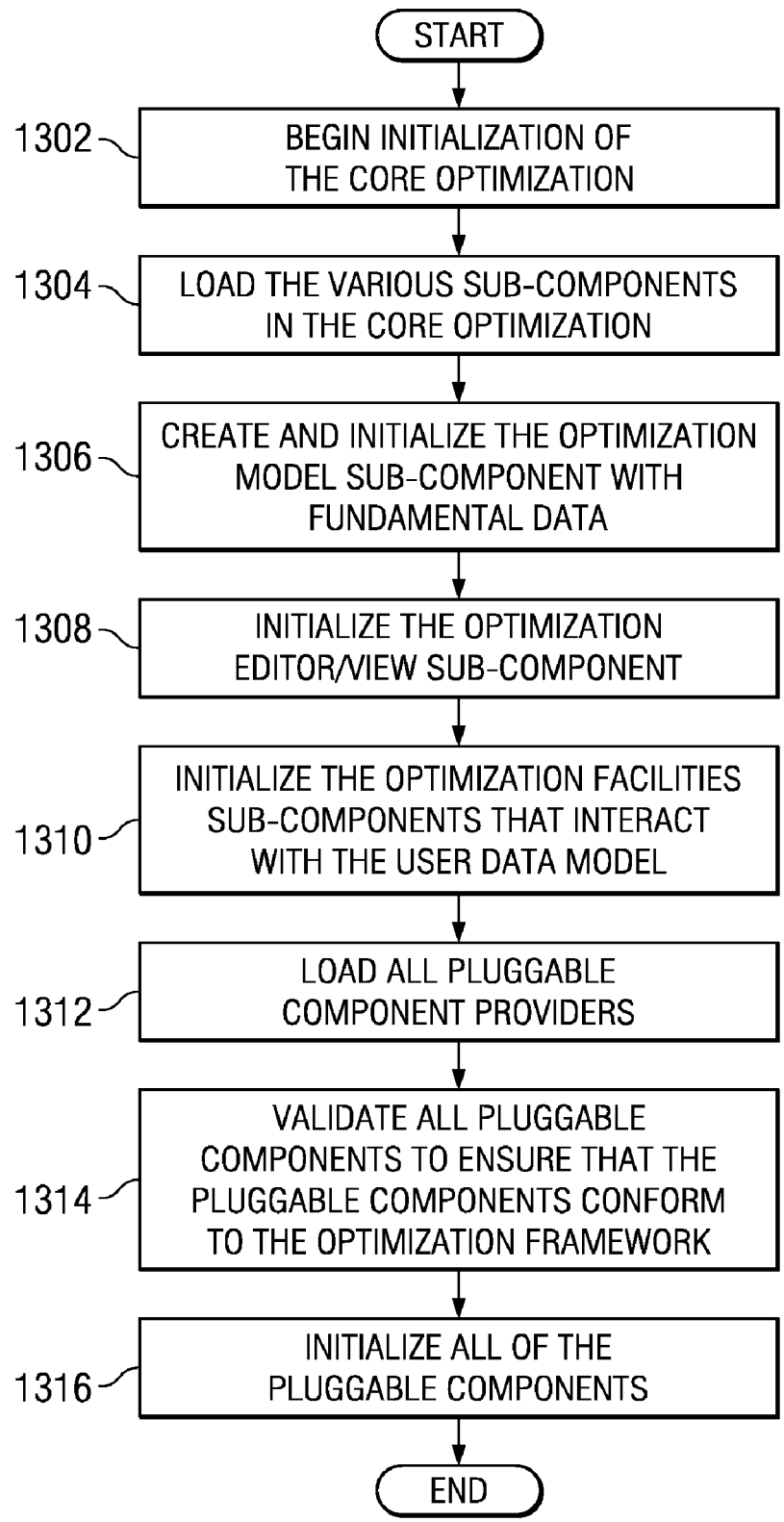
FIG. 13 is a flowchart of a process for creating the open, generalized optimization framework and architecture to deploy optimization solutions to tools or programs which builds on an integrated development environment platform.

FIG. 13 is a flowchart of a process for creating the open, generalized optimization framework and architecture to deploy optimization solutions to any tool or program that builds on the Eclipse platform. The process begins with the initializing of the core optimization 204 in FIG. 2 (step 1302). The core optimization loads up the various sub-components in the core optimization (step 1304). These sub-components may include the optimization model, the optimization editor/view, the optimization graph view, and the optimization facilities. The core optimization then creates and initializes the optimization model sub-component with fundamental data (step 1306). The core optimization also initializes the optimization editor/view sub-component (step 1308), and initializes the optimization facilities sub-components that interact with business process data model provided by the user (step 1310).

The core optimization then loads up of all pluggable component providers (step 1312). These pluggable component providers may include the optimization engine provider, the simulation engine provider, the input/output variable descriptors, and the user interface widget factory provider. The core optimization then validates all of the pluggable components to ensure that the pluggable components conform to optimization framework (step 1314). The core optimization then initializes all of the pluggable components (step 1316).

Figure 14:
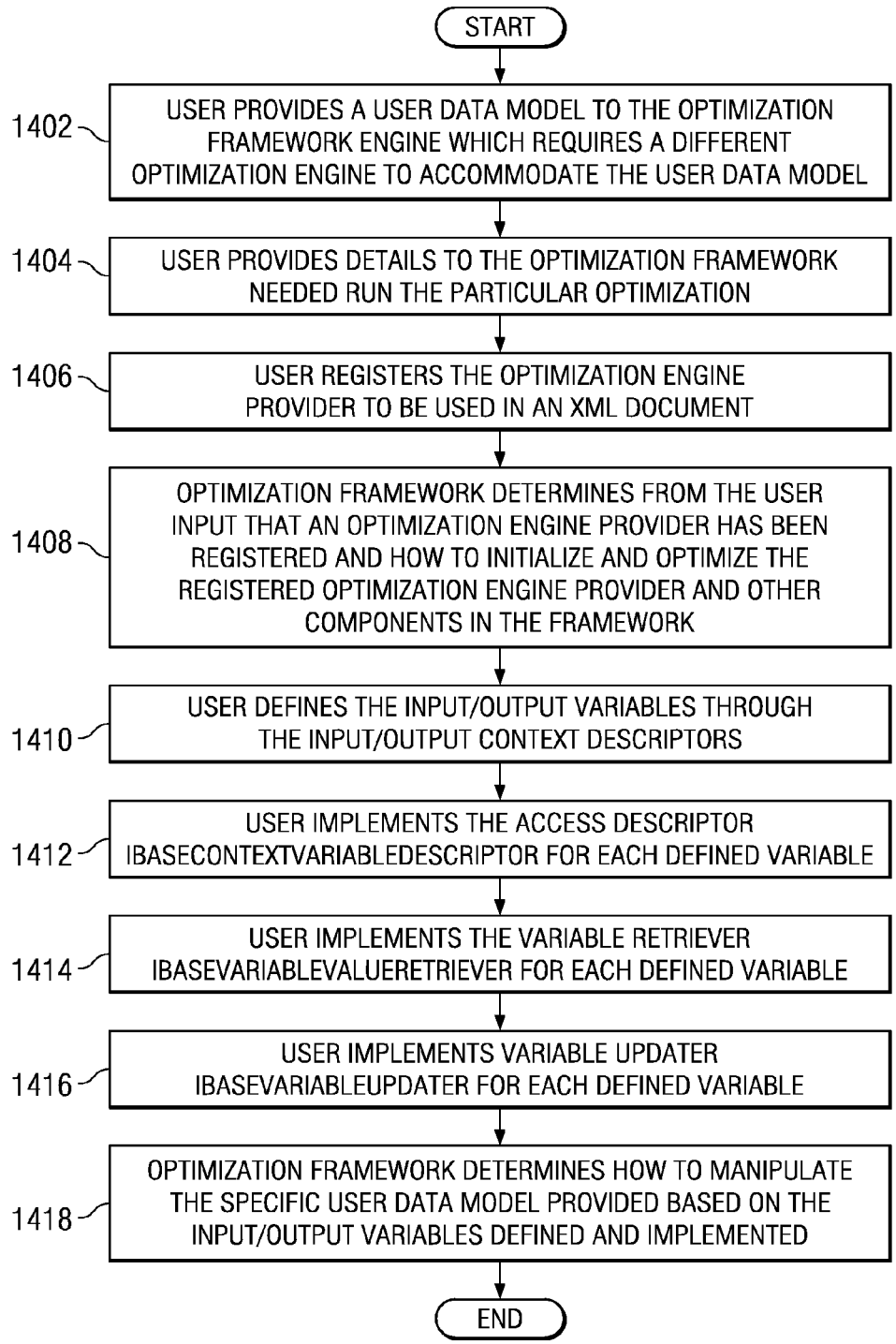
FIG. 14 is a flowchart of a process illustrating how a user may employ the optimization framework in accordance with the illustrative embodiments.

FIG. 14 is a flowchart of a process illustrating how a user may employ the optimization framework in accordance with the illustrative embodiments. This process describes how a user may utilize the optimization framework for optimization without regard to the format of the user's data model, and without proprietary engine or simulation providers. The user data model in the illustrative embodiments does not associate with the optimization engine or the simulation engine. Rather, the core optimization communicates with the optimization engine provider and simulation engine provider and requests all needed operations from them. In this manner, the optimization framework, optimization models, and other facilities act as a medium between the optimization engine and simulation engine providers and the user data model.

The process begins when a user provides a user data model to the optimization framework and needs to have the optimization engine provider plug-in to a different optimization engine to accommodate the user data model (step 1402). Although many optimization engine providers and simulation engine providers may be registered to the framework, only a single optimization engine provider and a single simulation engine provider will be used during optimization. The optimization/simulation engine provider to be used may be specified through the framework.

The user also provides details to the optimization framework needed run the particular optimization, such as how to start optimization by implementing the optimize( ) method, what optimization engine provider (or simulation engine provider) the optimization framework should setup and initialize via the initialize( ) method, and the like (step 1404). The user then registers the optimization engine provider to be used in an eXtensible Markup Language (XML) document (plugin.xml) which specifies which optimization engine provider is in use (step 1406).

Thus, the optimization framework may determine from the user input that an optimization engine provider has been registered and how to initialize and optimize the registered optimization engine provider and other components in the framework according to FIG. 13 (step 1408).

The user then defines the input/output variables through the input/output context descriptors (step 1410). For each variable that has been defined, the user implements the access descriptor IBaseContextVariableDescriptor (step 1412). The user also informs the optimization framework how to access and retrieve data from the user data model by implementing the variable retriever IBaseVariableValueRetriever for each defined variable (step 1414). The user further informs the optimization framework how to update data for the user data model by implementing variable updater IBaseVariableUpdater for each defined variable (step 1416).

Based on the input/output variables that user has defined and implemented, the core optimization determines how to manipulate the specific user data model provided (step 1418). As a result of the user's input, the optimization framework understands how to manipulate the user data model, as well as communicate with different optimization engine and simulation engine providers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for providing a non-proprietary parametric optimization solution, the data processing system comprising:
   a processor included in the data processing system executing code that provides an integrated development environment platform that is a first type;
   the processor executing code that provides an optimization framework and architecture of the first type built on top of the integrated development environment platform, including:
   a core optimization plugin that is the first type comprising an internal optimization model and a set of optimization tools; and
   a plurality of pluggable and customizable component providers and descriptors external to the core optimization plugin, wherein the plurality of pluggable and customization component providers and descriptors are a second type,
   wherein the core optimization plugin receives configuration information from a user,
   wherein the internal optimization model comprises a core model, a context model, and a runtime model;
   wherein the core model includes an optimization object, an objective object, and an optimization setting object;
   wherein the optimization object includes a plurality of objects that are included in an operation configuration object;
   wherein the objective object includes an objective of an optimization;
   wherein the optimization setting object includes an optimization profile setting of the optimization;
   wherein the optimization framework has received a particular user data model that is the second type from the user, wherein the particular data model is a domain model used by an application being used by the user,
   wherein the configuration information enables the core optimization plugin that is the first type to interact with the particular user data model that is the second type, and
   wherein the configuration information enables the core optimization plugin to interact with providers selected from the plurality of pluggable and customizable component providers and descriptors based on a format of the particular user data model;
   wherein the pluggable and customizable component providers and descriptors comprise at least one of an optimization engine provider, a simulation engine provider, a user interface widget factory provider, and input/output variable descriptors, wherein the optimization engine provider, the simulation engine provider, the user interface widget factory provider, and the input/output variable descriptors are the second type; and
   wherein the configuration information enables the core optimization plugin to interact with a particular optimization engine provider and a particular simulation engine provider in the plurality of pluggable and customizable component providers and descriptors, wherein the configuration information specifies the particular optimization engine provider and particular simulation engine provider registered by the user, and wherein the configuration information specifies the particular optimization engine provider and particular simulation engine provider to be initialized by the core optimization plugin.

2. The data processing system of claim 1, wherein the optimization framework receives a registration from a user via an XML document of an optimization engine that will be used that is the second type, wherein the core optimization plugin loads the internal optimization model and the set of optimization tools, creates and initializes the internal optimization model with fundamental data, initializes the set of optimization tools, loads the pluggable and configurable component providers and descriptors, validates the pluggable and configurable component providers and descriptors to ensure that the pluggable and configurable component providers and descriptors conform to the optimization framework and architecture, and initializes the pluggable and configurable component providers and descriptors.

3. The data processing system of claim 1, wherein the configuration information enables the core optimization plugin to interact with input/output variable descriptors, wherein the input specifies access descriptors, retrieve descriptors, and update descriptors for each defined variable.

4. The data processing system of claim 3, wherein the core optimization plugin interacts with the input/output variable descriptors to manipulate the particular user data model.

5. The data processing system of claim 1, wherein the set of optimization tools comprises at least one of an optimization graph, optimization editor, and optimization facilities.

6. The data processing system of claim 1, wherein the set of optimization tools enables the user to edit optimization profile settings and visualize optimization results independently of the pluggable and customizable component providers in use, and wherein the set of optimization tools enables the user to edit optimization profile settings and visualize optimization results using context data objects, wherein a first set of context data objects are used if the first type and the second type are the same, and wherein a second set of context data objects are used if the first type and the second type are different.

7. The data processing system of claim 6, wherein the optimization profile settings include simulation input control variables, output control variables, and optimization constraints.

8. The data processing system of claim 1, wherein the particular user data model is built using one of Java objects, JavaBeans, and an eclipse modeling framework (EMF).

9. The data processing system of claim 1, wherein the context model further comprises:
  a base context variable object that includes a variable that depends on whether a current user data model in use is the first type or the second type;
  a first base context object that is used if the current user data model in use is the first type; and
  a second base context object that is used if the current user data model in use is the second type.

10. A computer implemented method for providing a non-proprietary parametric optimization solution, the computer implemented method comprising:
  providing, using a processor, an integrated development environment platform that is a first type;
  providing, using the processor, an optimization framework and architecture that is the first type built on top of the integrated development environment platform which comprises a core optimization plugin comprising an internal optimization model and a set of optimization tools, and a plurality of pluggable and customizable component providers and descriptors external to the core optimization plugin, wherein the plurality of pluggable and customization component providers and descriptors are a second type,
  wherein the core optimization plugin receives configuration information from a user,
  wherein the internal optimization model comprises a core model, a context model, and a runtime model;
  wherein the core model includes an optimization object, an objective object, and an optimization setting object;
  wherein the optimization object includes a plurality of objects that are included in an operation configuration object;
  wherein the objective object includes an objective of an optimization;
  wherein the optimization setting object includes an optimization profile setting of the optimization;
  wherein the optimization framework has received a particular user data model of the second type from the user, wherein the particular data model is a domain model used by an application being used by the user,
  wherein the core optimization plugin that is the first type interacts with the particular user data model that is the second type using the configuration information, and
  wherein the core optimization plugin interacts with providers selected from the plurality of pluggable and customizable component providers and descriptors based on a format of the particular user data model using the configuration information;
  wherein the pluggable and customizable component providers and descriptors comprise at least one of an optimization engine provider, a simulation engine provider, a user interface widget factory provider, and input/output variable descriptors; and
  wherein the configuration information enables the core optimization plugin to interact with a particular optimization engine provider and a particular simulation engine provider in the plurality of pluggable and customizable component providers and descriptors, wherein the configuration information specifies the particular optimization engine provider and particular simulation engine provider registered by the user, and wherein the configuration information specifies the particular optimization engine provider and particular simulation engine provider to be initialized by the core optimization plugin.

11. The computer implemented method of claim 10, wherein the optimization framework receives a registration from a user via an XML document of an optimization engine that will be used that is the second type, wherein the core optimization plugin loads the internal optimization model and the set of optimization tools, creates and initializes the internal optimization model with fundamental data, initializes the set of optimization tools, loads the pluggable and configurable component providers and descriptors, validates the pluggable and configurable component providers and descriptors to ensure that the pluggable and configurable component providers and descriptors conform to the optimization framework and architecture, and initializes the pluggable and configurable component providers and descriptors.

12. The computer implemented method of claim 10, wherein the set of optimization tools enables the user to edit optimization profile settings and visualize optimization results independently of the pluggable and customizable component providers and descriptors in use, and wherein the set of optimization tools enables the user to edit optimization profile settings and visualize optimization results using context data objects, wherein a first set of context data objects are used if the first type and the second type are the same, and wherein a first set of context data objects are used if the first type and the second type are different.

13. The computer implemented method of claim 10, wherein the particular user data model is built using one of Java objects, JavaBeans, and an eclipse modeling framework (EMF).

14. The computer implemented method of claim 10, wherein the context model further comprises;
  a base context variable object that includes a variable that depends on whether a current user data model in use is the first type or the second type;
  a first base context object that is used if the current user data model in use is the first type; and
  a second base context object that is used if the current user data model in use is the second type.

* * * * *